(12) United States Patent
Mitchell et al.

(10) Patent No.: US 6,520,544 B1
(45) Date of Patent: Feb. 18, 2003

(54) RADIO FREQUENCY LABELS ON REUSABLE CONTAINERS

(75) Inventors: Nancy G. Mitchell, Grand Island, NY (US); Adele C. Shipston, Williamsville, NY (US); John R. Soltysiak, Blasdell, NY (US); Robert E. Grabau, North Tonawanda, NY (US)

(73) Assignee: Moore North America, Inc., Grand Island, NY (US)

( * ) Notice: Subject to any disclaimer, the term of this patent is extended or adjusted under 35 U.S.C. 154(b) by 0 days.

(21) Appl. No.: 09/480,157

(22) Filed: Jan. 10, 2000

(51) Int. Cl.[7] ................................................ B42D 15/00
(52) U.S. Cl. ............................ 283/70; 283/67; 283/81; 340/572.8
(58) Field of Search ............................ 283/81, 67, 70, 283/79, 80, 101, 117; 156/1, 249, 60; 340/572.1, 572.3, 572.8

(56) References Cited

U.S. PATENT DOCUMENTS

| 5,206,626 A | 4/1993 | Minasy et al. |
| 5,448,110 A | 9/1995 | Tuttle |
| 5,497,140 A | 3/1996 | Tuttle |
| 5,499,017 A | 3/1996 | Beigel |
| 5,628,858 A | 5/1997 | Petrou |
| 5,790,029 A | 8/1998 | Curnutte et al. |
| 5,867,102 A | 2/1999 | Souder et al. |
| 5,880,675 A | 3/1999 | Trautner |
| 6,019,865 A | 2/2000 | Palmer et al. |
| 6,025,780 A | 2/2000 | Bowers et al. |
| 6,281,795 B1 * | 8/2001 | Smith et al. ............. 340/572.1 |

FOREIGN PATENT DOCUMENTS

| EP | 0903686 | 3/1999 |
| FR | 2717593 | 9/1995 |
| WO | WO 01/00493 | 1/2001 |

* cited by examiner

*Primary Examiner*—Willmon Fridie, Jr.
(74) *Attorney, Agent, or Firm*—Nixon & Vanderhye PC

(57) ABSTRACT

It is possible to accurately and conveniently determine the origin, contents, position, and/or destination of a reusable container (such as a tote or bin, particularly for a manufacturing process) by applying a permanent adhesive label with embedded programmable RFID to the reusable container at a location where the RFID may be detected and reprogrammed. The RFID is programmed with accurate variable information including relating to at least one of the origin, contents, position, and destination of the container, and at at least one location the variable information of the RFID is detected. After a first use of the reusable container it is reprogrammed with other accurate variable information, and the detecting and reprogramming are repeated multiple times. Preferably the label is of a substantially moisture impermeable material such as a plastic film, or synthetic paper.

14 Claims, 4 Drawing Sheets

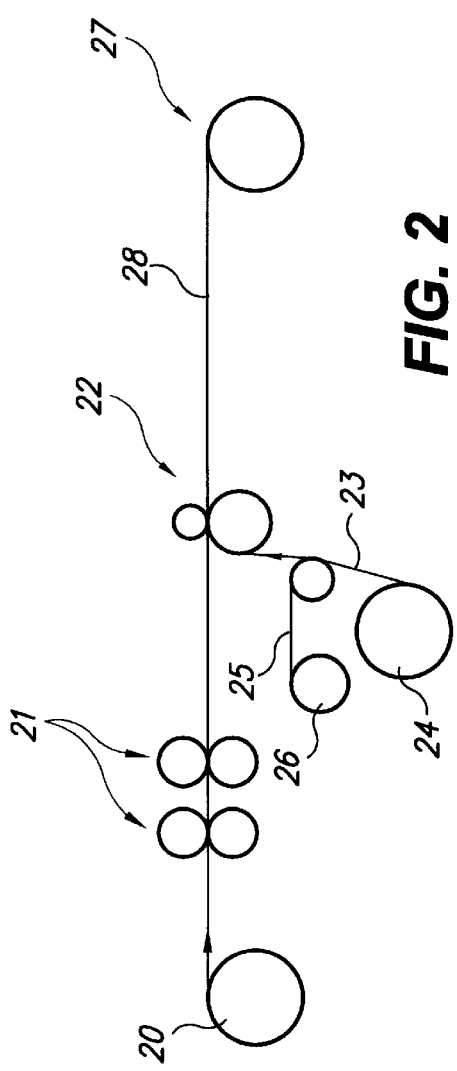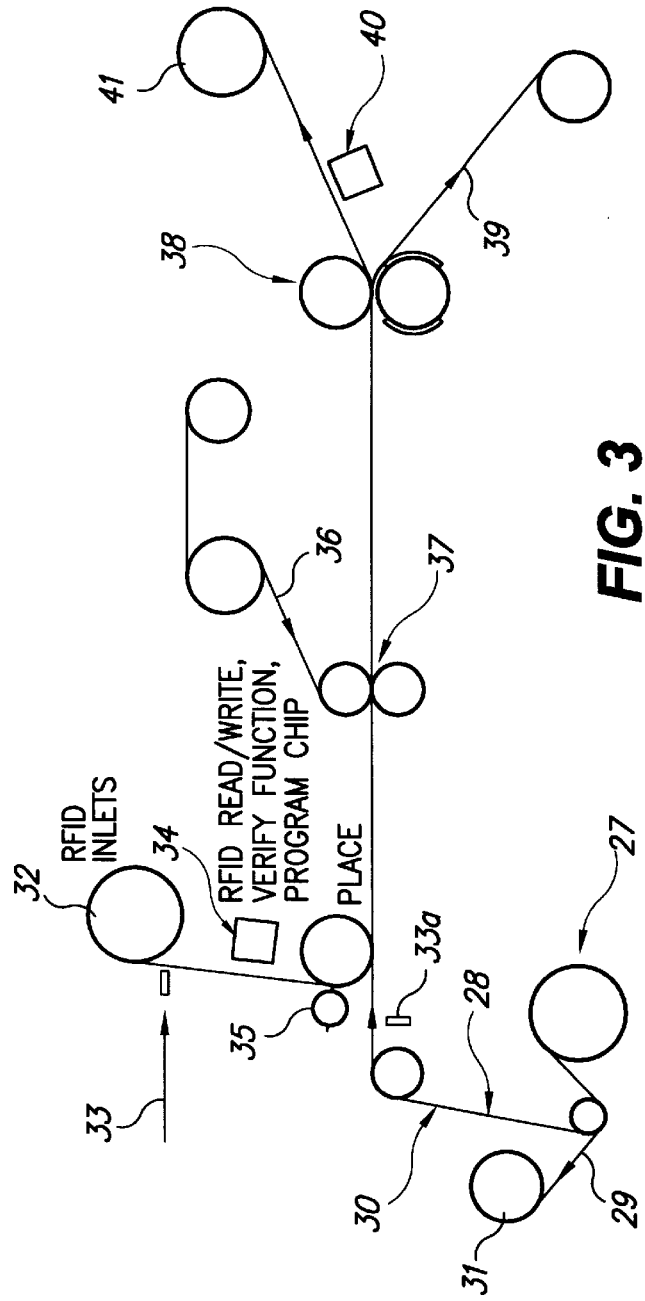

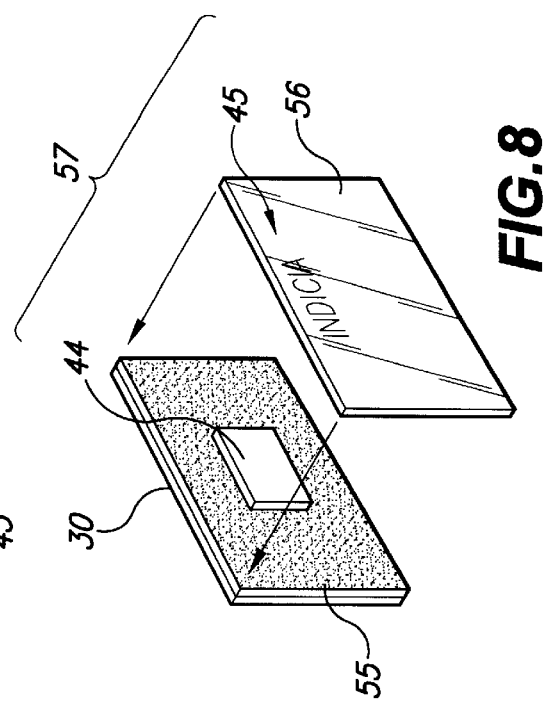
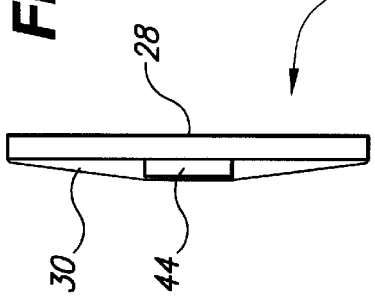
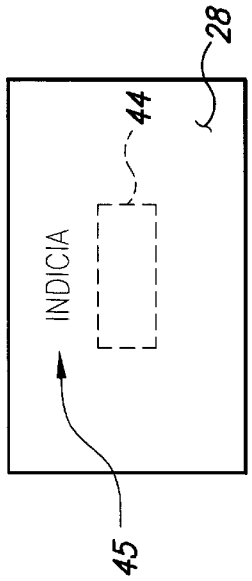
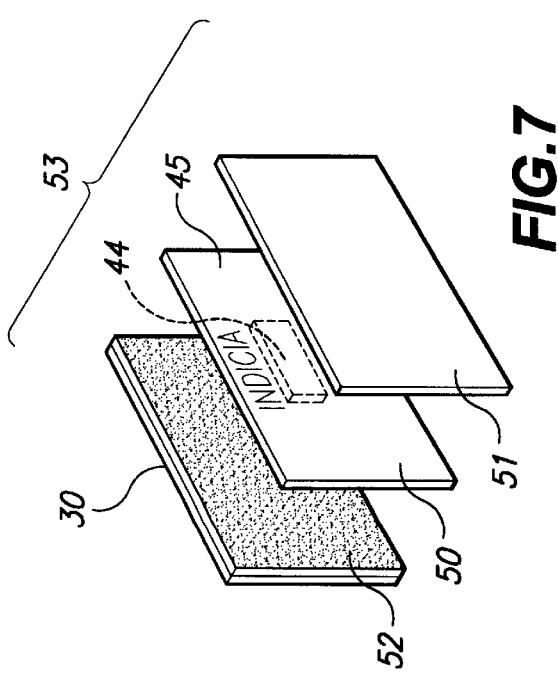

RADIO FREQUENCY LABELS ON REUSABLE CONTAINERS

BACKGROUND AND SUMMARY OF THE INVENTION

In many systems and processes, such as in industrial and manufacturing processes, reusable containers are used to transport raw materials or finished goods or objects from an origin station to others, and in order for the personnel running the process to be able to track and effectively utilize such reusable containers some sort of a labeling system is provided. A label typically provides information such as the origin and destination of the container, its contents, its particular position at a point in time, and a wide variety of things such as batch numbers, parts numbers, serial numbers, volume or quantity, etc.

Conventional labeling is typically done using some sort of a paper labeling system. For example, such as shown in U.S. Pat. No. 5,628,858, and the prior art discussed therein, a placard or envelope is provided which contains a discardable label which can have bar code or other information imaged therein, and which is removed and discarded once the container has been used for one particular use (for example transporting materials or objects from an origin point to a destination point). While such systems can be effective under many circumstances, there is the possibility that the integrity of the label will be compromised, or that it can be detached from the container, and also a fair of amount of waste is involved in constantly discarding labels.

According to the present invention a method of accurately determining the contents, position and/or designation of a reusable container, and such a reusable container per se, are provided. The invention is particularly suitable with respect to bins, totes, or other open top containers, but may be utilized with any type of reusable container whether open or closed. Also, the invention may be utilized with any suitable process for manufacturing or otherwise treating objects, goods, materials, products, or the like.

According to one aspect of the present invention there is provided a method of accurately determining at least one of the contents, position, and destination of a reusable container comprising: (a) Applying a permanent adhesive label with imbedded or mounted programmable RFID device to the reusable container at a location where the RFID device may be detected and reprogrammed. (b) Programming the RFID device with accurate variable information including relating to at least one of the origin, contents, position, and destination of the reusable container. (c) At at least one location, detecting the programmed variable information of the RFID device. (d) After a first use of the reusable container pursuant to the programmed variable RFID information thereof, reprogramming the RFID device with other accurate variable information including relating to at least one of the origin, contents, position, and destination of the reusable container. And (e) repeating (c) and (d) multiple times.

In the practice of the method typically (b) is also practiced to program the RFID device with non-variable information which is not affected by subsequent reprogramming pursuant to (d) and (e). Preferably (a) is practiced by using a substantially moisture impermeable label, and including a label with human readable indicia thereon visible from the exterior of the reusable container. Typically (a) is practiced by applying a label to the exterior of the reusable container (such as a flat surface thereof), although if the RFID device can be properly detected the label may be applied anywhere on the removable container.

According to one embodiment of the invention (a) practiced using a label made by combining an RFID chip with a face stock/transfer tape laminate, and verifying the functions of the RFID device at least twice prior to final label construction. According to another aspect of the invention (a) may be practiced using paper stock mounting an RFID chip laminated between two pieces of plastic film, one piece of plastic film having permanent adhesive on an exterior surface thereof. According to yet another embodiment (a) may be practiced using a plastic film stock having properties simulating those of paper with an RFID chip embedded therein.

Typically (b) (d), and (e) are practiced to program the RFID device with at least two of or all of the origin, contents, position, and destination of the reusable container, and the RFID device may be programmed to including other information also depending upon the material or objects or the like transported by the reusable container. Also, for example, the reusable container includes material or objects therein during passage thereof from a programming position to a destination position; and wherein (b)–(e) are practiced during a manufacturing process using or making the material or objects.

According to another aspect of the present invention a reusable container (such as a tote, bin, or the like) is provided comprising the following components: A container body adapted to hold therein material or objects being handled. A label having pressure sensitive permanent adhesive and an RFID programmable chip mounted thereon or embedded therein. And a label adhered to the reusable container by pressure sensitive adhesive.

The label is preferably of substantially moisture impervious material, and includes human readable indicia thereon. The label may be applied to the exterior of the reusable container, which may be one having an open top and containing material or objects therein that are inserted and removed through the open top. Also, the RFID chip is typically programmed by erasable variable information including at least one of (preferably all of, as well as possibly other information) the origin, contents, destination, and position thereof, and non-variable information.

It is a primary object of the present invention to provide an advantageous method of labeling a reusable container, and a reusable container per se. This and other objects of the invention will become clear from an inspection of a detailed description of the invention and from the appended claims.

BRIEF DESCRIPTION OF THE DRAWINGS

FIG. 2 is schematic view illustrating one manner in which a permanent laminate, for use in production of an RFID device label according to the invention, may be produced;

FIG. 3 is a schematic view illustrating utilization of the printed laminate of FIG. 2 to produce an RFID device label according to the invention;

FIG. 4 is a front view of an exemplary label according to the present invention;

FIG. 5 is a side schematic view of the label of FIG. 4;

FIGS. 7 and 8 are perspective schematic views of two different types of labels that may be constructed according to the present invention, showing them during the construction thereof.

DETAILED DESCRIPTION OF THE DRAWINGS

Figure 1:
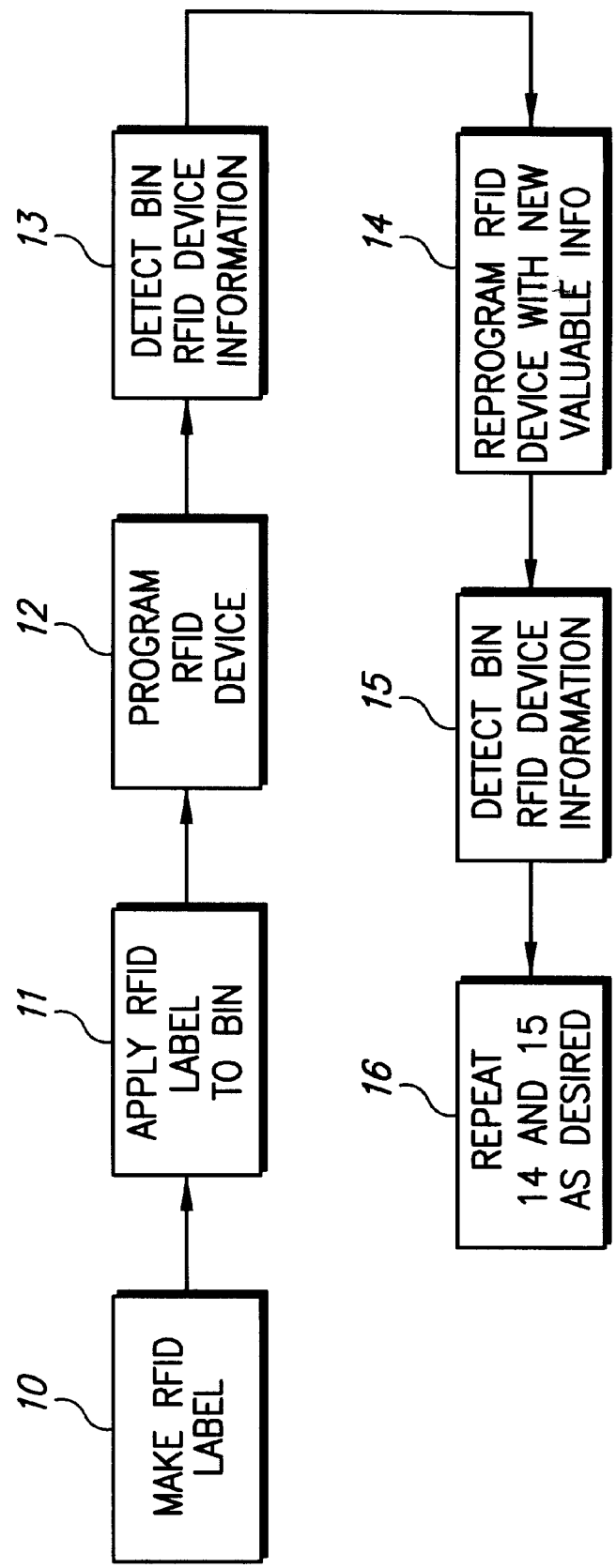
FIG. 1 is a schematic box diagram indicating various procedures that may be utilized in the practice of an exemplary method according to the present invention.

FIG. 1 diagrammatically illustrates one exemplary form of a method of accurately determining at least one of the origin, contents, position, and destination of a reusable container, according to the present invention. As indicated by block 10 in FIG. 1, a permanent adhesive label with programmable RFID device embedded therein or attached thereto is produced in a suitable conventional manner. As indicated by box 11, the permanent label is applied to a reusable container, such as a bin, tote, or the like. Virtually any container may be utilized, for example, for containers typically used to transport material or objects in manufacturing or related processes. While such containers typically have open tops, any type of reusable container (including closed containers, those having particular seals, or the like) may be utilized depending upon the particular process or system used. Substantially simultaneously with, just before, or after the label is applied to the reusable container, as indicated by box 12 the RFID device of the label is programmed utilizing conventional techniques, by accessing the RF inlet. The information that will be programmed in the RFID device includes at least one of the contents, position, and destination of a reusable container, and preferably comprises all of this information, as well as any other information that is suitable for that particular process, such as a serial number, part number, etc.

At one or more locations during the passage of the bin from its origin to its destination, as indicated by box 13 in FIG. 1, the RFID device mounted to the bin by the label is detected, utilizing any conventional detectors for that purpose. The detectors may be positioned on or adjacent to a track over which the reusable container moves, in association with a conveyor for conveying the container, or in any other suitable location as long as it is capable of detecting the RFID device and reading the relevant information for that location that is programmed into the RFID device. Any suitable existing detecting equipment that is capable of performing this function may be utilized.

After a first use of the reusable container, such as when it has reached its destination point and is to be recycled back to the origin (or moved from a new origin to a new destination), as indicated schematically by box 14 in FIG. 1 the RFID device is reprogrammed with new variable information. As indicated at 15 in FIG. 1, that new information is detected at one or more other locations as indicated by 15 in FIG. 1, and the reprogramming and detecting stages 14, 15 are repeated as desired, as indicated by box 16 in FIG. 1, for the life of the container and/or RFID device in the label.

The label manufacture stage 10 of FIG. 1 may be accomplished in a wide variety of manners. For example, as illustrated in FIG. 2 of the drawings, label face stock, such as of a moisture impermeable material such as TESLIN man-made paper-like material that is printable and water resistant, TYVEK, polyester or other plastic film stock that is printable, or the like, is unwound from a roll 20 and has indicia imaged on the top face thereof utilizing the conventional imaging/printing equipment 21 of any suitable type (such as impact or non-impact, flexographic, ink jet, or the like printers depending upon the substrate being imaged) and then that imaged face stock is laminated—as indicated at station 22 in FIG. 2, utilizing conventional laminating equipment—to transfer tape 23 being unwound from a roll 24, with the release liner 25 of the transfer tape 23 being taken up by roll 26. The printed laminate is then rewound to form the roll 27.

After the procedure in FIG. 2, as seen in FIG. 3, the printed laminate roll 27 is unwound so that the print face 28 thereof (see the face 28 in FIG. 2 also) is opposite the side where an RFID device is to be applied to/embedded in the final label to be produced, and the liner 29 covering the permanent pressure sensitive adhesive 30 of the printed laminate is removed utilizing roll 31.

To apply the RFID device, such as RFID inlets, in web configuration as illustrated schematically at 32 in FIG. 3, first the scanning procedure is practiced utilizing conventional scanning equipment illustrated schematically at 33 and 33a in FIG. 3 in order to register the RFID device to the print on the label face stock, and also an RFID read/write device 34 is provided to verify the functions of the programmable chip of the RFID device, and even possibly program it at least with non-variable information, and perhaps even some or all of desired variable information for the first utilization of the label containing the RFID device depending upon the particular process involved. Then the RFID device is cut from the web to which it is attached utilizing any suitable conventional cutting equipment such as illustrated schematically at 35 in FIG. 3 (such as a cutting cylinder having 180° out of phase blades cooperating with an anvil cylinder), and the RFID device is placed on the adhesive 30 of the printed laminate. Then where the labels are lined labels, a release liner 36 is laminated over the adhesive in the RFID device utilizing conventional equipment 37, labels are die cut from the substrate utilizing the conventional die cutting equipment illustrated schematically at 38 in FIG. 3, and the cutoff matrix may be removed as illustrated schematically at 39 in FIG. 3. The final web of labels then preferably passes past a final RFID read verification station 40, and the finished RFID device labels are wound onto a roll 41 which is transported to a location where the labels are to be utilized.

FIGS. 4 and 5 schematically illustrate a label 43 according to the present invention from the roll 41 after removal of the release liner thereof, in FIG. 5 showing the RFID device 44 greatly enlarged in thickness for clarity of illustration. The label has indicia 45 thereon that is human readable, on the face 28, and may also have machine readable indicia such as bar codes or the like if desired. The adhesive 30 on the face of the label 43 opposite the face 28 is shown schematically in FIG. 5, and it is permanent adhesive that when applied to a surface will essentially permanently be fixed thereto. That is the adhesive will not normally be detachable from the surface to which it is applied without taking very special steps to remove it, and/or requiring destruction of the label 43 to do so.

Figure 6:
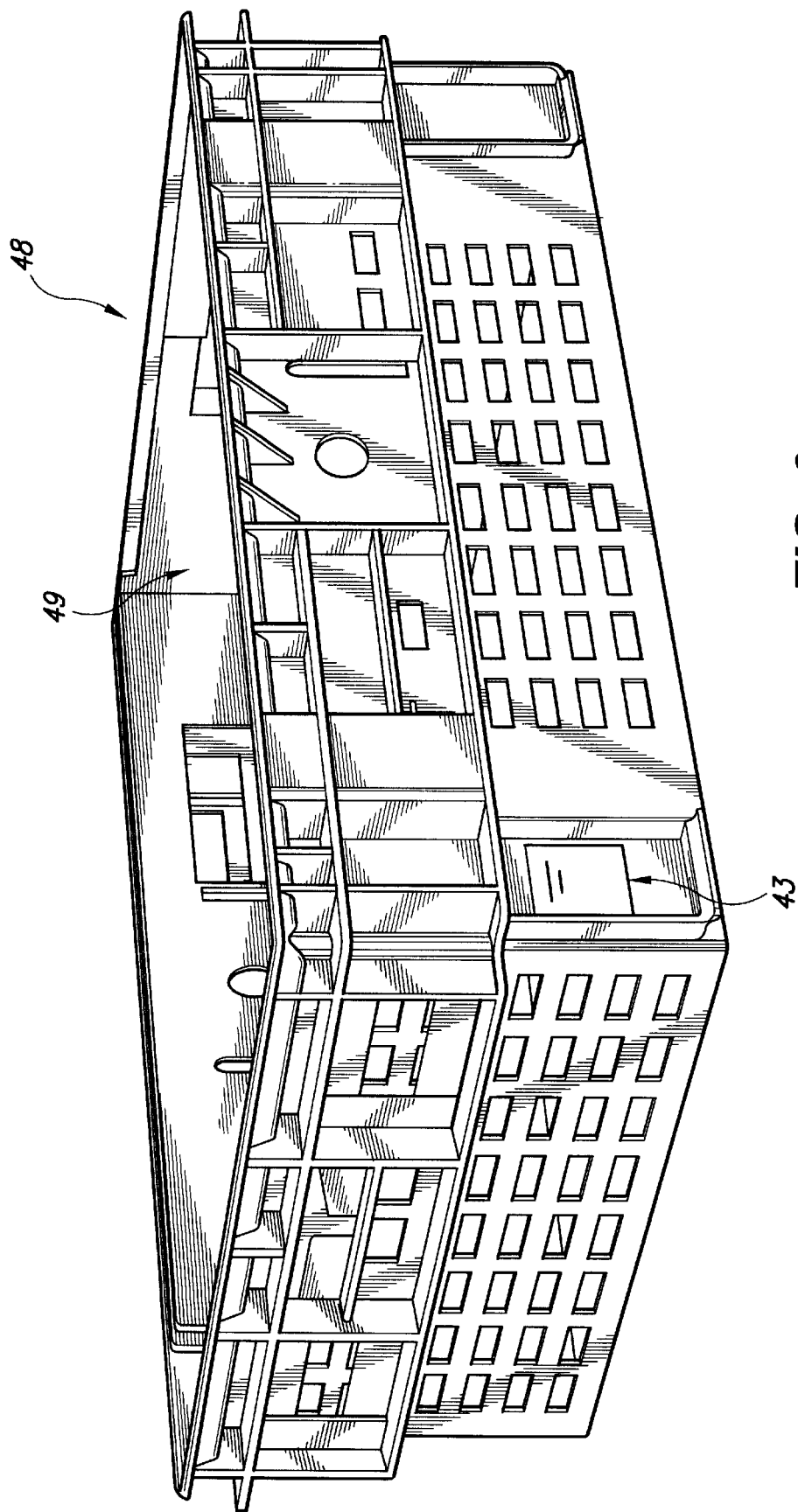
FIG. 6 is a perspective schematic view of an exemplary reusable container according to the present invention.

FIG. 6 schematically illustrates, generally by reference numeral 48, an exemplary reusable container according to the present invention, in this case in the form of a tote or bin. It is to be understood that the illustration in FIG. 6 is schematically and exemplary only, and that there are virtually an infinite variety of different types of totes, bins, or like reusable containers, both open topped (see the open top 49 for the bin 48 in FIG. 6) or closed containers. For the particular embodiment illustrated in FIG. 6, objects or materials may be placed in the bin 48 through the open top 49 thereof and transported by the bin 48 by conveyors, tracks, carts, or any other suitable type equipment, from an origin position past a number of different positions to an ultimate destination.

According to the present invention a label 43 is shown applied to the bin 48. In this preferred embodiment the label 43 is applied to an exterior substantially flat surface of the bin 48 with the permanent adhesive 30 permanently adhering the label 43, with embedded or attached RFID device 44, to the bin 48, and with the indicia 45 being readable from the exterior of the container 48 by a human operator. While an exterior location is typically the most convenient for the label 43, as long as the detecting equipment utilized associated with the RFID device is suitable, and as long easy human readability of the label indicia is not necessary, the label 43 may be placed on an interior surface of the bin 48, on the bottom thereof, or at any other suitable location.

An RFID device 44, which includes a programmable chip, may be programmed with non-variable information, such as the bin designation (type of bin, normal usage, first use date, serial number, or any other information desired), as well as variable information which changes each time the bin 48 completes a defined task (that is when it reaches a destination station). During each use it is also programmed with variable information, which contains at least one or two of the origin of the bin 48, the contents of the bin 48 (that is the objects or material held thereby), its ultimate destination, position information (for tracking the position of the bin 48 and where it is to be at certain points of time), and/or any other information desired. The programmable chip of the conventional RFID device 44 may then be re-programmed with other variable information (canceling out the initial variable information) throughout the entire life of the bin 48, label 43, or RFID device 44, which of the components wears out first being dependent upon the particular process and components involved.

Two other ways that an exemplary label according to the present invention, which preferably is substantially water or moisture impervious, can be constructed are illustrated schematically at FIGS. 7 and 8.

In FIG. 7 conventional paper stock (such as bond or card stock) 50 having indicia 45 thereon and an RFID device 44 embedded therein or mounted thereon, is sandwiched between two pieces of plastic substantially moisture impervious film 51, 52, at least the film 51 being transparent so that the indicia 45 is visible. The films 51, 52 may be held to the paper stock 50 by permanent adhesive or in any other suitable manner. On the back of the film 52 is permanent pressure sensitive adhesive 30 which attaches the final label 53 of FIG. 7 to the bin 48 or other reusable container.

FIG. 8 which schematically illustrates an embodiment having stock 55 that is itself substantially moisture impermeable, such as TESLIN having an RFID device 44 mounted thereon or embedded therein, and having pressure sensitive permanent adhesive 30 on the back face thereof, has a plastic or other moisture impervious film 56 applied thereover. The film 56 may be transparent or opaque, and if opaque has indicia 45 thereon (and if transparent the indicia 45 typically will be on the stock 55). The film 56 is held to the stock 55 with conventional permanent adhesive or in any other suitable manner, to produce a final label 57 which is used just like the label 43 as described above.

It will thus be seen that according to the present invention an advantageous method of labeling reusable containers, and reusable containers produced thereby, have been provided which have a number of advantages compared to conventional methods and systems. The labeling system will always be permanently affixed to the reusable container, is not easily damaged nor the information thereon obscured, does not require the constant replacement of material but rather is simply reprogrammed in a simple and conventional manner, over a long life. The mounting of the RFID device which facilitates achieving the advantages of the invention is simple yet effective.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent methods and products.

What is claimed is:

1. A method of accurately determining at least one of the origin, contents, position, and destination of a reusable container comprising:

(a) applying a permanent adhesive label with imbedded or mounted programmable RFID device to the reusable container at a location where the RFID device may be detected and reprogrammed;

(b) programming the RFID device with accurate variable information including relating to at least one of the contents, position, and destination of the reusable container;

(c) at at least one location, detecting the programmed variable information of the RFID device;

(d) after a first use of the reusable container pursuant to the programmed variable RFID information thereof, reprogramming the RFID device with other accurate variable information including relating to at least one of the origin, contents, position, and destination of the reusable container; and (e) repeating (c) and (d) multiple times.

2. A method as recited in claim 1 wherein (b) is also practiced to program the RFID device with non-variable information which is not affected by subsequent reprogramming pursuant to (d) and (e).

3. A method as recited in claim 1 wherein (a) is practiced using a substantially moisture impermeable label.

4. A method as recited in claim 1 wherein (a) is practiced using a label with human readable indicia thereon visible from the exterior of the reusable container.

5. A method as recited in claim 1 wherein (a) is practiced to apply the label to the exterior of the reusable container.

6. A method as recited in claim 2 wherein (a) is practiced using a substantially moisture impermeable label.

7. A method as recited in claim 6 wherein (a) is practiced using a label with human readable indicia thereon visible from the exterior of the reusable container.

8. A method as recited in claim 7 wherein (a) is practiced to apply the label to the exterior of the reusable container.

9. A method as recited in claim 1 wherein (a) is practiced using a label made by combining an RFID chip with a face stock/transfer tape laminate, and verifying the functions of the RFID device at least twice prior to final label construction.

10. A method as recited in claim 1 wherein (a) is practiced using paper stock mounting an RFID chip laminated between two pieces of plastic film, one piece of plastic film having permanent adhesive on an exterior surface thereof.

11. A method as recited in claim 1 wherein (a) is practiced using a plastic film stock having properties simulating those of paper with an RFID chip embedded therein or mounted thereon.

12. A method as recited in claim 1 wherein (b) (d), and (e) are practiced to program the RFID device with all of the origin, contents, position, and destination of the reusable container.

13. A method as recited in claim 12 wherein the reusable container includes material or objects therein during passage thereof from a programming position to a destination position; and wherein (b)–(e) are practiced during a manufacturing process using or making the material or objects.

14. A method as in claim 1, wherein said label is applied directly to the reusable container so that said label is substantially permanently applied thereto at said location.

* * * * *